April 13, 1948.  J. HAPPEL  2,439,730
CRACKING PROCESS TO PRODUCE GASEOUS OLEFINS
Filed July 16, 1946  2 Sheets-Sheet 2

INVENTOR
JOHN HAPPEL
BY
ATTORNEY

Patented Apr. 13, 1948

2,439,730

UNITED STATES PATENT OFFICE 2,439,730

CRACKING PROCESS TO PRODUCE GASEOUS OLEFINS

John Happel, Brooklyn, N. Y., assignor to Socony-Vacuum Oil Company, Incorporated, a corporation of New York Application July 16, 1946, Serial No. 683,833

7 Claims. (Cl. 260—683)

This invention relates to a process for the thermal conversion of hydrocarbons at high temperature and short contact time to produce substantially the same product from two different charges by contact with a compact moving bed of hot granular solid.

The process is adaptable to those hydrocarbon reactions which involved extensive cracking of the charge at high temperature and very short reaction time to give selective high yields of desired specific compounds. Unsaturated hydrocarbons in the nature of ethylene and acetylene can be produced by cracking at temperatures on the order of about 1500° F. for reaction times on the order of a fraction of a second, say 0.2 second. The desired reaction temperature varies somewhat with the nature of the stock and the contact time, but, in general, normally liquid hydrocarbons can be cracked to produce high yields of ethylene at temperatures around 1350 to 1450° F., while normally gaseous hydrocarbons such as propane require higher temperatures. Optimum temperatures for propane are around 1450–1550° F., and for ethane around 1500 to 1600° F. (contact times up to 2 seconds). The production of acetylene involves still higher temperatures above about 1800° F. and up to about 2300° F.

These reactions are advantageously conducted by passing the charge hydrocarbons in direct contact with a compact moving bed of highly heated granular solid and quenching the gaseous reaction products to give a very short reaction time and thus substantially inhibit secondary condensation or polymerization reactions.

In general, the optimum temperature varies with the reaction time. Where, as in the present invention, the charge is contacted with a hot solid, similar yields may be obtained at varying temperatures by varying the depth of the bed of hot granular solids. According to the present invention, a single compact moving bed is utilized to produce large yields of ethylene and the like from two dissimilar charging stocks such as normally liquid hydrocarbons and normally gaseous hydrocarbons.

A mass of highly heated granular solid is passed downwardly as a compact moving bed through a contacting zone having a plurality of contacting sections. In a first contacting section, a normally gaseous hydrocarbon charge is passed in direct contact with the compact heated solid thereby heating the charge vapors to reaction temperature and cooling the granular solid. The charge of normally gaseous hydrocarbon is controlled as to temperature and quantity so that the granular solid discharged from the first section is at a temperature above the reaction temperature desired for the next succeeding section. In the subsequent section or sections, a normally liquid charge hydrocarbon is passed in direct contact with the granular solid to thereby heat the heavier charge to its reaction temperature. The vaporous products of reaction from the several sections are then combined and quenched to reduce their temperature below that at which secondary reactions take place. If desired, a preliminary quench of minor extent may be conducted separately on the two or more vaporous reaction mixtures but the principal quench is conducted on the combined product vapors. The normally liquid charge may be introduced to the contacting zone in liquid phase to be both vaporized and heated by the contact with hot granular solid. By way of contrast, the charge to the first contacting zone is always in vapor phase. Substantial quantities of steam have a desirable effect on the course of the reaction and water should be introduced to each of the contacting zones to provide the desirable steam. In the first contacting zone the water is vaporized and may be preheated to any desired extent before introduction to the contact zone. In the last section, liquid water may be admitted to be vaporized and heated by contact with the hot granular solid.

By means of the present invention, it is possible to conduct the reaction of normally gaseous hydrocarbons in contact with hot granular solid to produce ethylene and the like without being forced to waste a portion of the heat content of the solids in order to reduce the same to a temperature suitable for handling in conventional elevators and the like for recirculation in the system. Thus, the use of a second contacting section for reaction of normally liquid hydrocarbons, not only reduces the amount of auxiliary recovery and purification equipment necessary for handling the vaporous products of two reactions, but also results in the useful application of large amounts of heat which would otherwise be abstracted from the granular solid for the sole purpose of rendering the same suitable for transfer by an elevator.

These and other objects and advantages of the invention are illustrated by consideration of a specific method for practicing the invention, apparatus for that purpose being shown in the annexed drawings; wherein Figure 1 is a flow sheet of the essential elements of a plant for practicing the invention;

Figure 1:
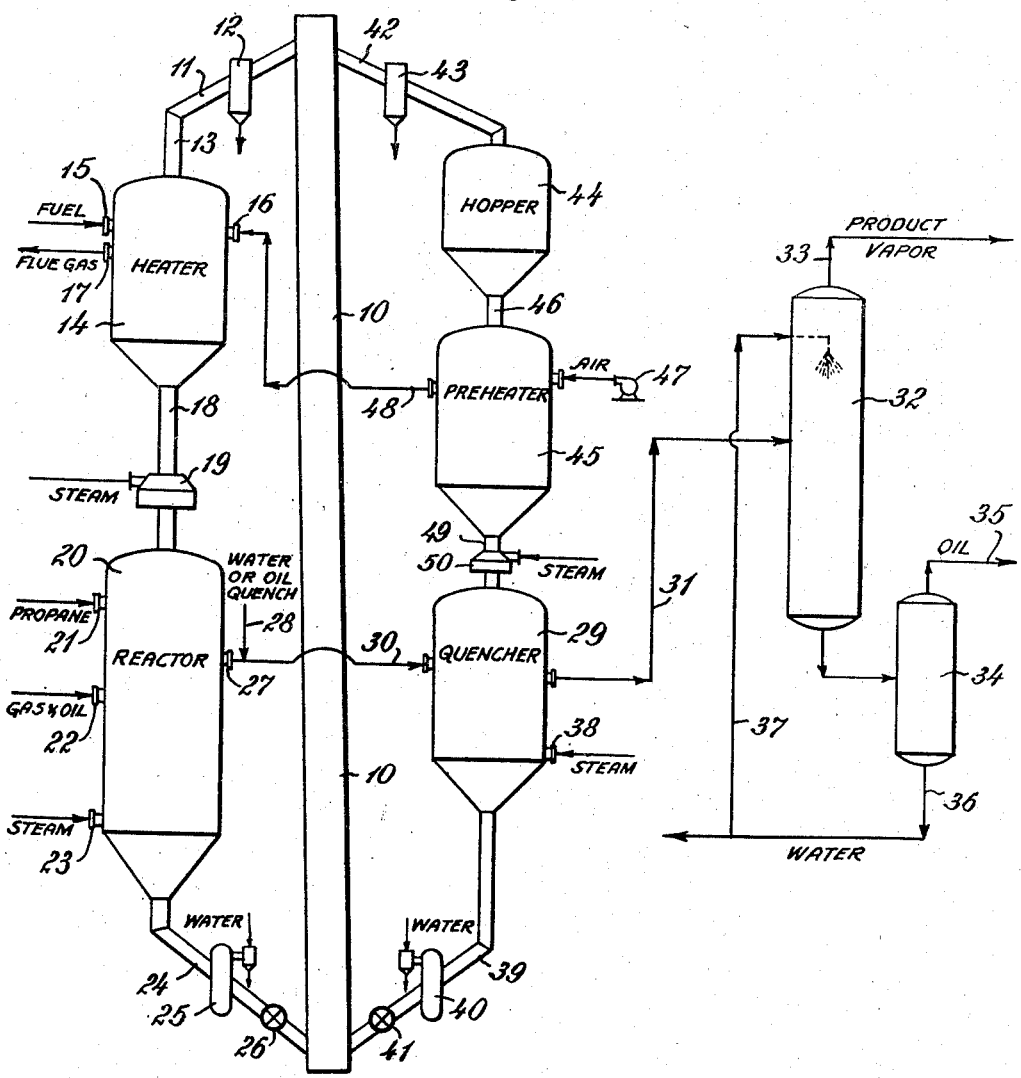

As shown in Figure 1, a hot granular solid, such as fused alumina pellets having an average particle diameter of 0.3 inch, is circulated through two series of vessels constituting a reaction cycle and a quenching cycle. The granular solids used for the two series may be maintained separate but as shown here, the two cycles follow a common path in part in that a single elevator 10 is used to return the solids from the bottom of each cycle to the top for again passing through the reaction and quenching cycles respectively. A suitable divider at the top of elevator 10 splits the recycled stream into two parts which are diverted to the reaction and quenching cycles.

That portion of the granular solid passed to the reaction cycle is conducted by a sloping line 11 through a classifier 12 for removal of particles smaller than that desired to a feed leg 13 which supplies a heater 14. In heater 14 fuel and air supplied at 15 and 16 respectively are combined to produce a flame which is passed through the mass of granular solid in the heater to raise its temperature to the desired extent, for example, to 1775° F. Flue gases are discharged at 17 and passed to a suitable economizer or stack. The highly heated granular solid passes downwardly through a feed leg 18 having a steam sealing zone 19 which prevents intermixing of gases from the heater and reactor. The feed leg 18 supplies a reactor 20 wherein the hot granular solid comes in direct contact with a normally gaseous charge introduced at 21 and a normally liquid charge introduced at 22. The mass of solids is then purged with steam supplied at port 23 and transferred by conduit 24 through a depressuring pot 25 and valve 26 to control flow and maintain compact beds in the heater and reactor to the elevator 10.

In a typical operation, propane may be introduced at port 21 at 1000° F. in admixture with 50% by weight of steam at the same temperature. Gas oil and 50% by weight of water can be admitted at port 22. The ratio of the first charge (port 21) to solids is adjusted to reduce the temperature of the hot granular solid from 1750° F. (at which temperature it enters the reactor) to about 1650° F. The gas oil and water at substantially atmospheric temperature vaporizes to produce a mixture of gas oil vapors and water which passes countercurrently to the moving bed of solids and is thereby heated to about 1600° F. or slightly thereabove, reducing the temperature of the granular solid to about 900° F. The vaporous reaction mixtures are combined and withdrawn at port 27. Water or oil for quenching purposes is introduced by line 28 to reduce the reaction mixture to about 1200° F. and it is then transferred to a quencher 29 by transfer line 30. Direct contact in quencher 29 with granular solids at about 400° F. reduces the vapors to about 450° F. at which temperature they are conveyed by transfer line 31 to a spray condenser 32 and there further cooled to 100° F. and separated into a crude vapor product withdrawn overhead at 33 for purification and a liquid fraction which is transferred to a settler 34. An upper oil layer is withdrawn by line 35 from the settler 34 and passed to suitable equipment for recovering valuable components thereof such as highly aromatic gasolines and naphthas. The water layer from settler 34 is withdrawn by pipe 36 and recycled in part by pipe 37 to the spray condenser. Water withdrawn from settler 34 may be used for admission to the reactor in liquid phase or to supply the water quench line 28. The generation of steam within the reactor by the introduction of liquid water makes it possible to use badly contaminated water.

Returning now to the quencher 29, steam is admitted at port 38 to purge the solids which are then transferred by line 39 through depressuring pot 40 and valve 41 to the elevator 10. Preferably the temperature of solids passed to the elevator 10 by lines 24 and 39 is about the same, for example, 900° F. From the top of elevator 10, a suitable portion of granular solid passes by conduit 42 through classifier 43 to a hopper 44 which supplies preheater 45 by way of a feed leg 46. Air is supplied to preheater 45 from a compressor 47 and passes in direct contact with the solids therein thereby cooling the solids to the temperature desired for admission to quencher 29 and heating the air. This preheated air is preferably used as the air supplied for heater 14 to which it is supplied by transfer line 48. The cooled solids from preheater 45 pass by feed leg 49 through steam sealing zone 50 to the quencher 29.

Figure 2:
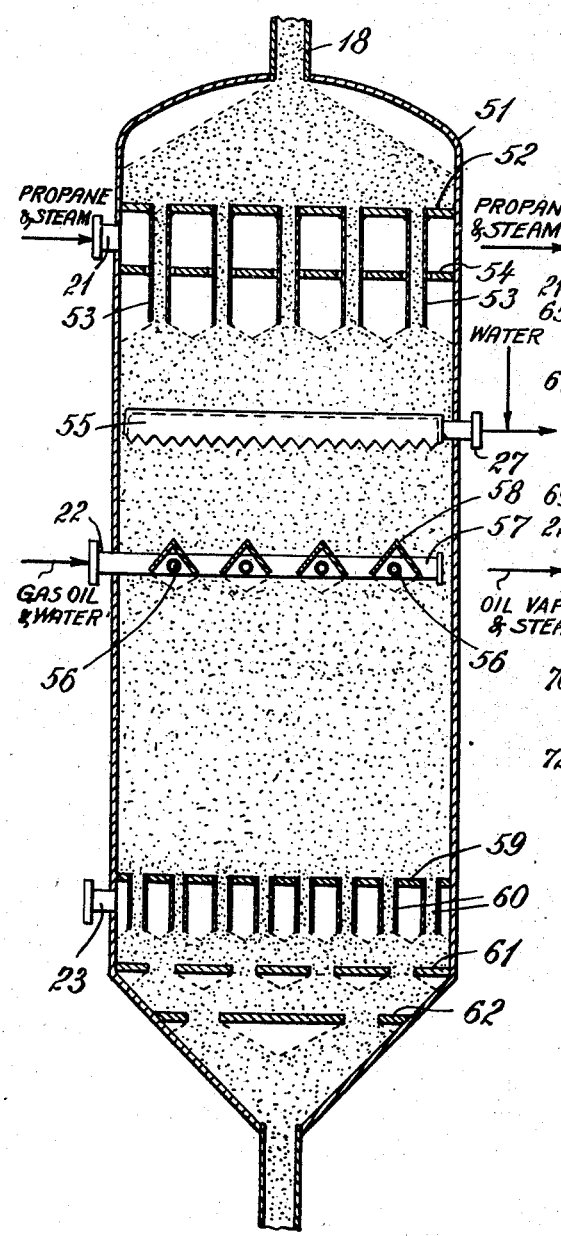
Figure 2 is a vertical section through the reactor.

A reactor adapted to operate in the manner discussed generally above is shown in Figure 2 and includes a shell 51 to which the hot granular solids are supplied by feed leg 18. A plate 52 in the top of the reactor serves to make of the top of the reactor a supply hopper from which granular solids are distributed uniformly across the reactor by feed pipes 53. The mixture of propane and steam admitted at port 21 is distributed uniformly across the bed of hot granular solids as by orifices about the feed pipes 53 in a plate 54. These orifices are of such size as to provide a substantial pressure drop across the plate 54 thus insuring uniform feed to the space above the compact moving bed below feed pipes 53. The charge mixture of propane and steam passes concurrently with the moving bed to a vapor collector 55 discharging through port 27. The gas oil and water admitted at port 22 are supplied to a plurality of perforated distributing pipes 56 branching from a manifold 57. An angle iron 58 over each of the perforated pipes 56 provides a clear space in the compact moving bed of solids to which the liquid charge is admitted. Immediate vaporization of a large portion of the charge takes place and the resultant vapors move upwardly in generally countercurrent flow to the granular solids to the vapor collector 55, at which point they mix with vaporous reaction products from the cracking of propane thereabove. Liquid phase cracking and vaporization of heavy ends of the liquid charge may take place on the granular solids below distributors 56, thus providing additional vapors which pass upwardly and mingle with those produced instantaneously at the point of introduction.

Uniform flow of granular solids across the bed is insured by a plurality of flow control plates in the bottom of the reactor. The top plate 59 has a number of tubes 60 depending therefrom, each of which draws uniformly from a region diverging thereabove. The purge steam admitted at port 23 is distributed through the space about pipes 60 below the plate 59 and a portion of the steam passes upwardly through the pipes 60 to effectively purge volatile materials from the granular solid. Plate 61 has a lesser number of orifices than does plate 59 and those orifices are so disposed as to draw uniformly from a plurality of pipes 60 thereabove. Similarly, plate 62 assures that the flow through the several orifices of plate 61 shall be uniform.

Figure 3:
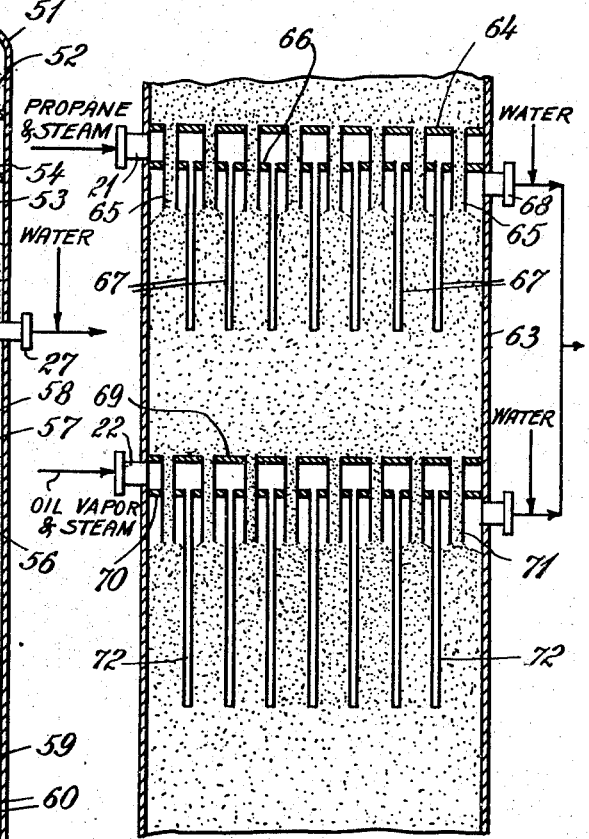
Figure 3 is a partial vertical section of a modified type of reactor.

Figure 3 shows a reactor wherein the flow of charge hydrocarbons through the bed of granular solid is countercurrent in each of the contacting sections. The shell 63 is fitted with a plate 64 which retains granular solid to be fed downwardly by feed pipes 65. A second plate 66 cooperates with the plate 64 to form a manifold from which the charge mixture of propane and steam is distributed through the moving bed by drop pipes 67. The charge passes upwardly through the bed in a generally counter-current direction to a disengaging space about the pipes 65 from which it is withdrawn by port 68. A similar arrangement for admission of the normally liquid charge includes an upper plate 69 and a lower plate 70. Feed pipes 71 supply granular solid from above plate 69 while charge is admitted to the bed by drop pipes 72 from the manifold between plates 69 and 70. This type of manifold obviously does not lend itself to charging a mixture of oil and water and this specific form of apparatus therefore requires a previously vaporized charge. Slight modifications make it possible to use a liquid charge in this type of apparatus, as for example separate manifolds and drop pipes for oil and water or even introduction of the oil and water at different points in the bed. Thus, the introduction and vaporization of steam below the point of oil introduction results in the steam passing upwardly and aiding in vaporization of the oil at the point of introduction of the latter.

I claim:

1. A process for simultaneously converting a propane charge and a gas oil charge to high yields of normally gaseous olefins by maintaining each of said charges at high temperature conversion conditions for a short period of time which comprises heating a downwardly moving stream of granular solid heat transfer material in a heating zone to a temperature not lower than about 1600 to 1700° F., passing said heated solid downwardly to and downwardly through a vertical reaction zone below said heating zone, passing said propane charge in direct contact with said material in an upper section of said zone to thereby heat said normally gaseous charge to at least about 1500° F. and cool said material to a temperature between about 1450° F. and 1650° F., passing said gas oil charge in liquid phase in direct contact in a lower section of said zone with said material cooled by contact with said propane charge to thereby vaporize said gas oil charge and heat it to a conversion temperature between about 1350° F. and 1650° F., removing hot products of reaction from said sections, cooling said hot products below the temperature at which further reaction occurs, and fractionating the products from said sections together to recover normally gaseous olefins therefrom, removing said material from the bottom of said reaction zone and returning it to the top of said heating zone.

2. A process for simultaneously converting a normally gaseous hydrocarbon charge and a normally liquid hydrocarbon charge to high yields of normally gaseous olefins by maintaining each of said charges at high temperature conversion conditions for a short period of time which comprises heating a downwardly moving stream of granular solid heat transfer material in a heating zone to a temperature not lower than about 1450° F., passing said heated solid downwardly to and downwardly through a vertical reaction zone below said heating zone, passing said normally gaseous charge in direct contact with said material in an upper section of said zone to thereby heat said normally gaseous charge to conversion temperature and cool said material to a temperature not lower than about 1350° F., passing said normally liquid charge in liquid phase in direct contact in a lower section of said zone with said material cooled by contact with said normally gaseous charge to thereby vaporize said normally liquid charge and heat it to conversion temperature, removing hot products of reaction from said sections, cooling said hot products below the temperature at which further reaction occurs, fractionating the products from said sections together to recover normally gaseous olefins therefrom, removing said material from the bottom of said reaction zone and returning it to the top of said heating zone.

3. A process for simultaneously converting a normally gaseous hydrocarbon charge and a normally liquid hydrocarbon charge to high yields of normally gaseous olefins by maintaining each of said charges at high temperature conversion conditions for a short period of time which comprises heating a downwardly moving stream of granular solid heat transfer material in a heating zone to a temperature not lower than about 1450° F., passing said heated solid downwardly to and downwardly through a vertical reaction zone below said heating zone, passing said normally gaseous charge in direct contact with said material in an upper section of said zone to thereby heat said normally gaseous charge to conversion temperature and cool said material to a temperature not lower than about 1350° F., passing said normally liquid charge in direct contact in a lower section of said zone with said materal cooled by contact with said normally gaseous charge, removing hot products of reaction from said sections, cooling said hot products below the temperature at which further reaction occurs, fractionating the products from said sections together to recover normally gaseous olefins therefrom, removing said material from the bottom of said reaction zone and returning it to the top of said heating zone.

4. A process for simultaneously converting a propane charge and a gas oil charge to high yields of normally gaseous olefins by maintaining each of said charges at high temperature conversion conditions for a short period of time which comprises heating a moving stream of granular solid heat transfer material to a temperature not lower than about 1700° F., passing said heated solid downwardly through a vertical reaction zone, passing said propane charge in direct contact with said material in an upper section of said zone to thereby heat said normally gaseous charge to at least about 1700° F. and cool said material to a temperature between about 1450° F. and 1650° F., passing said gas oil charge in liquid phase in direct contact in a lower section of said zone with said material cooled by contact with said propane charge to thereby vaporize said gas oil charge and heat it to a conversion temperature between about 1450° F. and 1650° F., removing hot products of reaction from said sections, cooling said hot products below the temperature at which further reaction occurs, and fractionating the products from said sections together to recover normally gaseous olefins therefrom.

5. A process for simultaneously converting a normally gaseous hydrocarbon charge and a normally liquid hydrocarbon charge to high yields of normally gaseous olefins by maintaining each of said charges at high temperature conversion conditions for a short period of time which comprises heating a moving stream of granular solid heat transfer material to a temperature not lower than about 1450° F., passing said heated solid downwardly through a vertical reaction zone, passing said normally gaseous charge in direct contact with said material in an upper section of said zone to thereby heat said normally gaseous charge to conversion temperature and cool said material to a temperature not lower than about 1350° F., passing said normally liquid charge in liquid phase in direct contact in a lower section of said zone with said material cooled by contact with said normally gaseous charge to thereby vaporize said normally liquid charge and heat it to conversion temperature, removing hot products of reaction from said sections, cooling said hot products below the temperature at which further reaction occurs, and fractionating the products from said sections together to recover normally gaseous olefins therefrom.

6. A process for simultaneously converting a normally gaseous hydrocarbon charge and a normally liquid hydrocarbon charge to high yields of normally gaseous olefins by maintaining each of said charges at high temperature conversion conditions for a short period of time which comprises heating a moving stream of granular solid heat transfer material to a temperature not lower than about 1450° F., passing said heated solid downwardly through a vertical reaction zone, passing said normally gaseous charge in direct contact with said material in an upper section of said zone to thereby heat said normally gaseous charge to conversion temperature and cool said material to a temperature not lower than about 1350° F., passing said normally liquid charge in direct contact in a lower section of said zone with said material cooled by contact with said normally gaseous charge, removing hot products of reaction from said sections, cooling said hot products below the temperature at which further reaction occurs, and fractionating the products from said sections together to recover normally gaseous olefins therefrom.

7. A process for simultaneously converting a normally gaseous hydrocarbon charge and a normally liquid hydrocarbon charge to high yields of normally gaseous olefins by maintaining each of said charges at high temperature conversion conditions for a short period of time, which comprises heating a moving stream of granular solid heat transfer material to a temperature not lower than about 1450° F., passing said heated solid downwardly through a vertical reaction zone, passing said normally gaseous charge in direct contact with said material and in generally concurrent flow therewith in an upper section of said zone to thereby heat said normally gaseous charge to conversion temperature and cool said material to a temperature not lower than about 1350° F., passing said normally liquid charge in direct contact in a lower section of said zone with said material cooled by contact with said normally gaseous charge, said last named contacting being conducted generally countercurrent to the direction of flow of said material, removing hot products of reaction from said sections at the adjacent ends thereof, cooling said hot products below the temperature at which further reaction occurs, and fractionating the products from said sections together to recover normally gaseous olefins therefrom.

JOHN HAPPEL.

REFERENCES CITED

The following references are of record in the file of this patent:

UNITED STATES PATENTS

| Number | Name | Date |
|---|---|---|
| 2,222,489 | Riggs | Nov. 19, 1940 |
| 2,338,573 | Creelman | Jan. 4, 1944 |
| 2,356,611 | Peters | Aug. 22, 1944 |